United States Patent
Lin et al.

(10) Patent No.: US 8,471,508 B2
(45) Date of Patent: Jun. 25, 2013

(54) MOTOR CONTROL APPARATUS

(75) Inventors: Chien-Sheng Lin, Taoyuan Hsien (TW);
Zong-Hong Tang, Taoyuan Hsien (TW);
Wen-Chuan Ma, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 491 days.

(21) Appl. No.: 12/831,588

(22) Filed: Jul. 7, 2010

(65) Prior Publication Data
US 2011/0043147 A1 Feb. 24, 2011

(30) Foreign Application Priority Data
Aug. 19, 2009 (TW) ................. 98127783 A

(51) Int. Cl.
*H02P 6/06* (2006.01)
(52) U.S. Cl.
USPC ............ 318/400.06; 318/400.17; 318/400.42
(58) Field of Classification Search
USPC ............ 318/400.06, 400.17, 400.42, 400.04, 318/803, 609, 717, 400.1, 400.21, 400.11, 318/400.33
See application file for complete search history.

(56) References Cited

U.S. PATENT DOCUMENTS
5,412,583 A * 5/1995 Cameron et al. ............ 700/279

* cited by examiner

*Primary Examiner* — Karen Masih
(74) *Attorney, Agent, or Firm* — Muncy, Geissler, Olds & Lowe, PLLC

(57) ABSTRACT

A motor control apparatus includes a phase sensing circuit, current sensing circuit, phase lock loop, controller and driving circuit. The phase sensing circuit detects a phase switching state of a magnetic pole of a motor circuit, then generates and outputs a phase switching signal to the phase lock loop during motor operation. The current sensing circuit detects current flowing through a coil of the motor to generate and output a current phase signal to the phase lock loop. The phase lock loop compares a phase difference between the phase switching signal and the current phase signal to generate and output a phase-switch controlling signal to the controller. The controller generates and outputs a driving signal to the driving circuit in accordance with the phase-switch controlling signal. The driving circuit controls the phase switching state of the magnetic pole to drive the motor in accordance with the driving signal.

16 Claims, 6 Drawing Sheets

MOTOR CONTROL APPARATUS

CROSS REFERENCE TO RELATED APPLICATIONS

This Non-provisional application claims priority under 35 U.S.C. §119(a) on Patent Application No(s). 098127783 filed in Taiwan, Republic of China on Aug. 19, 2009, the entire contents of which are hereby incorporated by reference.

BACKGROUND OF THE INVENTION

1. Field of Invention

The present invention relates to a motor control apparatus, which can synchronize phases of a phase switching signal and a current phase signal to promote operation efficiency of the motor.

2. Related Art

Conventional motor is enabled through interaction between a stator and a rotor, which are two major components in the motor, oppositely disposed in a motor. By providing magnetic attraction and magnetic field variation, a rotation of the rotor corresponding to the stator can be induced. During the motor operation, the magnetic field variation represents commutation of the magnetic pole of the motor. As shown in FIG. 1, a conventional motor 2 generally uses an electronic phase converter for commutation. In more detailed, the electronic phase converter regularly uses a Hall sensor 13 to detect the position of the magnetic pole (or the magnetic field variation) of the motor 2 so as to determine the rotor position. The driving integrated circuit 11 then outputs a driving signal Sd to a driving circuit 12 for controlling the coil currents in the stator of the motor 2 to switch mutually in purpose of commutation according to the phase switching signal Sp generated by the Hall sensor 13.

Moreover, the detecting ability of the Hall sensor 13 for the magnetic field variation depends on the rotating speed of the motor 2 and the disposed position of the Hall sensor 13. Therefore, the Hall sensor 13 must be arranged on the most feasible position for accurate detection. The Hall sensor 13 in the conventional direct-current (DC) brushless motors is always disposed forwardly on purpose for leading commutation so as to promote the motor efficiency at a rating rotating speed and form current waveform Si as shown in FIG. 2A as well.

However, the Hall sensor 13 cannot automatically shift to a feasible position after the rotating speed of the motors 2 is changed. When the rotating speed of the motor 2 is controlled at a slow speed, the motor 2 efficiency declines from the optimal status and, meanwhile, the current waveform is not as even as the original. As shown in FIGS. 2B and 2C, when the loading is changed (when the fan is in back pressure) or the voltage source is changed, it probably results in a leading or lagging magnetic phase state of the phase switching signal Sp detected by the Hall sensor 13, which causes the motor 2 efficiency falls from the optimal point as well. Meanwhile, the current of the motor 2 is either leading (with a protruding front portion) or lagging (a protruding back portion) can be indicated from the current waveform Si of the motor 2. Because of it, the driving IC 11 may output an improper driving signal Sd to the driving circuit 12 so that it causes an unsmooth commutation of the motor 2 and induces noise. Particularly, when the motor 2 is applied for fans, the heat dissipation efficiency of the fans is consequently decreased.

SUMMARY OF THE INVENTION

In view of the foregoing, the present invention provides a motor control apparatus, which can promote the operation efficiency of the motor and reduce the noise (vibration) during the motor's operating.

To achieve the above, the present invention provides a motor control apparatus, which includes a phase sensing circuit, a current sensing circuit, a phase lock loop, a controller and a driving circuit. The phase sensing circuit detects a phase switching state of a magnetic pole of a motor, and then generates and outputs a phase switching signal to the phase lock loop when the motor is operating. The current sensing circuit detects a current flowing through a coil of the motor to generate and output a current phase signal to the phase lock loop. The phase lock loop compares a phase difference between the phase switching signal and the current phase signal to generate and output a phase-switch controlling signal to the controller. The controller generates and outputs a driving signal to the driving circuit in accordance with the phase-switch controlling signal. The driving circuit controls the phase switching state of the magnetic pole of the motor for driving the motor to rotate in accordance with the driving signal.

Consequently, the motor control apparatus of the present invention can track the phase difference between the phase switching signal and the current phase signal of the motor it detects, and then outputs the adjusted phase-switch controlling signal for driving the motor. Therefore, even if the motor is operated at different rotating speeds, or the power terminals or the loadings have variations, the motor control apparatus still can sustainably and promptly provide immediate and proper phase adjustments for the phase-switch controlling signal in accordance with the error value computed from the feed-backed sensing signals. Then, the motor control apparatus locks the phases of the current phase signal and the phase switching signal of the motor it detects as they are synchronized, so that the motor control apparatus can provide the motor with higher operation efficiency and current waveform with even shape.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3:
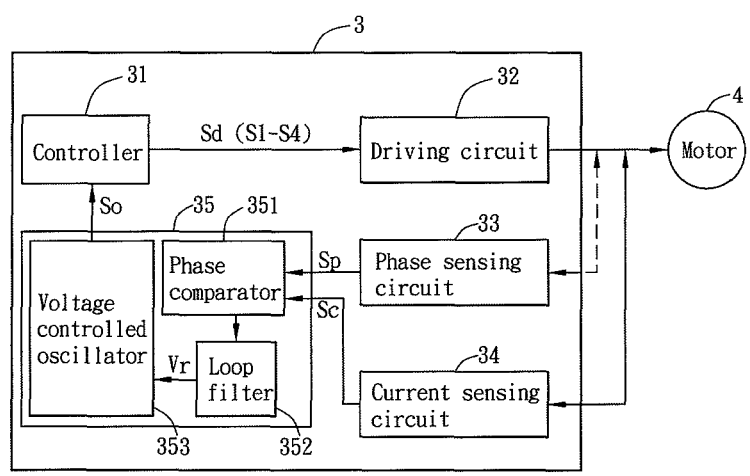
FIG. 3 is a circuit block diagram of a motor control apparatus of the present invention.

As shown in FIG. 3, a motor control apparatus 3 of the preferred embodiment of the present invention is electrically connected to a motor 4 and includes a controller 31, a driving circuit 32, a phase sensing circuit 33, a current sensing circuit 34 and a phase lock loop 35. The driving circuit 32 is electrically connected to the motor 4 and the controller 31 respectively. The phase lock loop 35 is electrically connected to the phase sensing circuit 33, the current sensing circuit 34 and the controller 31. The motor 4 can be a direct current brushless motor.

Figure 4:
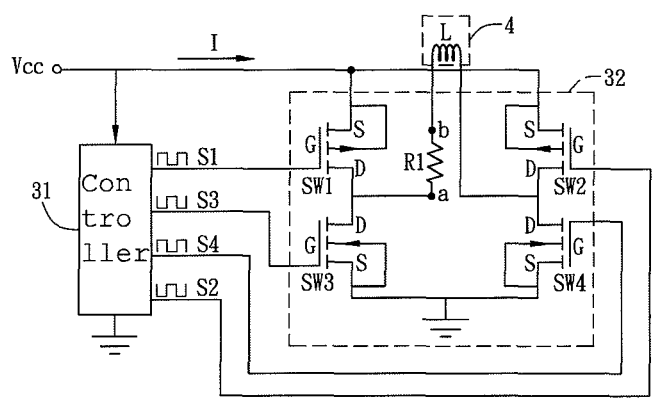
FIG. 4 is a circuit block diagram of the motor control apparatus in accordance with the first preferred embodiment of the present invention.

Referring to FIG. 4, the driving circuit 32 is, for example, a full-bridge (H-bridge) circuit, which at least includes a first switch element SW1 and a second switch element SW2 of upper halves of the H-bridge and a third switch element SW3 and a forth switch element SW4 of lower halves of the H-bridge circuit. The switch elements SW1 to SW4 are electrically connected between a coil L of the motor 4 and the controller 31, and each of the switch elements SW1 to SW4 can be a metal-oxide-semiconductor field-effect transistor (MOSFET). For example, the first switch element SW1 and the second switch element SW2 can be PMOS (such transistor representing the channels of these two elements are P-type), and the third switch element SW3 and the forth switch element SW4 can be NMOS (such transistor representing the channels of these two elements are N-type). The followings are the electrical connections of the above-mentioned full-bridge circuit: a drain D of the first switch element SW1 and a drain D of the second switch element SW2 of the upper halves of the bridge are electrically connected to two ends of the coil L of the motor 4 respectively, a source S of the first switch element SW1 and a source S of the second switch element SW2 are electrically connected to a power supply Vcc respectively, a gate G of the first switch element SW1 and a gate G of the second switch element SW2 are electrically connected to the controller 41 respectively, a drain D of the third switch element SW3 and a drain D of the forth switch element SW4 are electrically connected to the two ends of the coil of the motor 4, respectively, and also electrically connected to the drains D of the first and second switch elements SW1 and SW2 respectively, a gate G of the third switch element SW3 and a gate G of the forth switch element SW4 are electrically connected the controller 31 respectively, and a source S of the third switch element SW3, and a source S of the forth switch element SW4 are electrically connected to a grounding terminal.

The controller 31 is, for example, a motor drive integrated circuit (IC), and is electrically connected to the gates G of the first, second, third and forth switch elements SW1 to SW4 of the driving circuit 32, respectively, for outputting a driving signal Sd (S1 to S4) to each of the switch elements SW1 to SW4.

The phase sensing circuit 33 can include a Hall sensor. The Hall sensor is disposed between slot openings of silicon steel plates of the motor 4 (between the magnetic poles) in order to detect the phase switching state of the magnetic pole for generating and outputting a phase switching signal Sp to a first input end of the phase lock loop 35 during the motor's 4 operating.

Figure 5A:
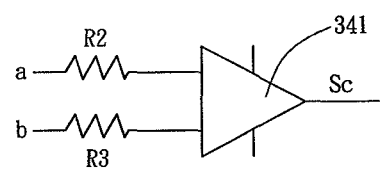
FIG. 5A is a circuit diagram showing a part of the current sensing circuit (not including the first resistor R1) in accordance with the first preferred embodiment of the present invention.

Further Referring to FIGS. 4 and 5A, the current sensing circuit 34 is for detecting the current flowing through the coil L of the motor 4 to generate and output a current phase signal Sc to a second input end of the phase lock loop. The current sensing circuit 34 can include a first resistor R1 and a first comparator 341. A first end of the first resistor R1 (end b as shown in FIG. 4) is electrically connected to the coil L of the motor 4. A second end of the first resistor R1 (end a as shown in FIG. 4) is electrically connected to the drains D of the first and third switch elements SW1 and SW3. Additionally, a first input end and a second input end of the first comparator 341 are electrically connected to the second and third resistors R2 and R3, respectively, and then are electrically connected to the first and second ends of the first resistor R1 respectively. The output end of the first comparator 341 is electrically connected to a second input end of the phase lock loop 35.

Figure 5B:
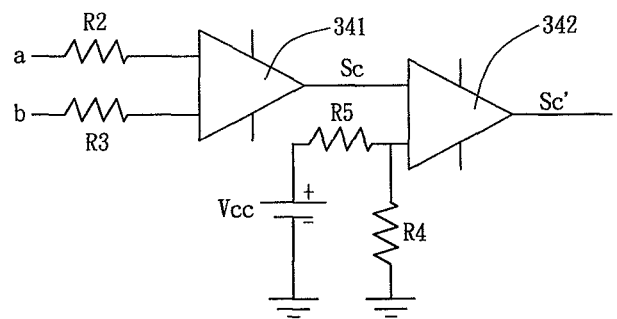
FIG. 5B is a circuit diagram showing a part of the current sensing circuit (not including the sixth and seventh resistors R6 and R7) in accordance with the second preferred embodiment of the present invention.

As shown in FIG. 5B, for reducing noise of the signal outputted by the first comparator 341, the output end of the first comparator 341 can be further electrically connected to a first input end of a second comparator 342 and, meanwhile, a second input end of the second comparator 342 is electrically connected to a first end of a forth resistor R4 and a first end of a fifth resistor R5 respectively. In addition, a second end of the forth resistor R4 is grounded, and a second end of the fifth resistor R5 is electrically connected to the power supply Vcc and then grounded. An output end of the second comparator 342 is electrically connected to the second input end of the phase lock loop 35.

In the aforementioned embodiment, the resistor values of the second and third resistors R2 and R3 can be fairly low, for example 0.1Ω (Ohm), and the resistor values of the forth and fifth resistors R5 and R6 can be the same.

Figure 6:
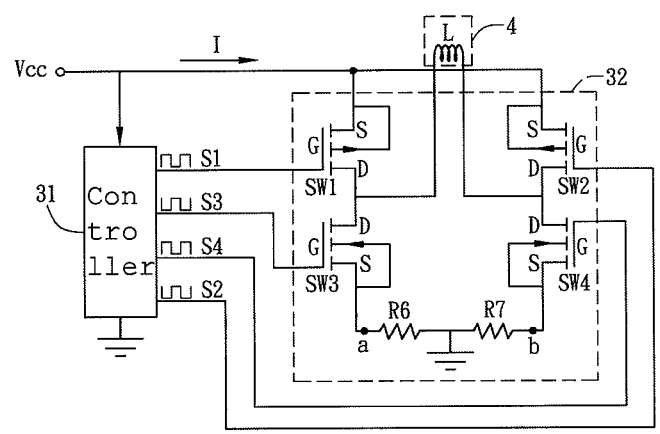
FIG. 6 is a circuit schematic diagram of the motor control apparatus in accordance with the second preferred embodiment of the present invention.

Otherwise, according to the embodiment as shown in FIG. 6, although the circuit connection mode between the current sensing circuit 34 and the driving circuit 32 is different, it is still feasible to obtain the current phase signal Sc or Sc'. The current sensing circuit 34 includes the sixth resistor R6, the seventh resistor R7 and the first comparator 341. A first end of the sixth resistor R6 (end a as shown in FIG. 6) and a first end of the seventh resistors R7 (end b as shown in FIG. 6) are electrically connected to the sources S of the third and forth switch elements SW3 and SW4, respectively, and a second end of the sixth resistor R6 and a second end of the seventh resistors R7 are grounded. The first and second input ends of the first comparator 341 are electrically connected to the second and third resistors R2 and R3, respectively, and then electrically connected to the first ends of the sixth and seventh resistors R6 and R7, respectively. Similarly, for reducing the signal noise outputted by the first comparator 341, the output end of the first comparator 341 can be further connected to a second comparator 342 with the electrical connection mode as shown in FIG. 5B so that the detailed description thereof will be omitted.

The phase lock loop 35 is electrically connected to the phase sensing circuit 33, the current sensing circuit 34 and the controller 31. The phase lock loop 35 includes a phase comparator 351, a loop filter 352 and a voltage controlled oscillator 353. Furthermore, the loop filter 352 is electrically connected to the phase comparator 351 and the voltage controlled oscillator 353 respectively. A first input end and a second input end of the phase comparator 351 is electrically connected to the phase sensing circuit 33 and the current sensing circuit 34, respectively, to receive the phase switching signal Sp and the current phase signal Sc respectively. An output end of the voltage controlled oscillator 353 is electrically connected to the controller 31.

As shown in FIGS. 3, 4 and 5A, the action mechanism of the motor control apparatus of the present invention will be described hereinafter.

The current sensing circuit 33 detects the phase switching state of the magnetic pole to generate and output the phase switching signal Sp to the phase comparator 351 of the phase lock loop 35 during the motor's 5 operating.

Figure 7:
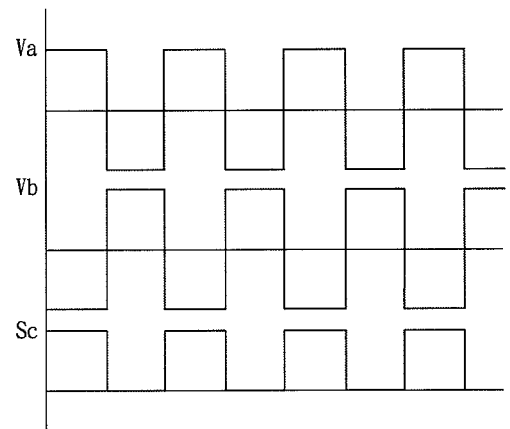
FIG. 7 is a schematic diagram showing the waveform of the current phase signal generated by the current sensing circuit of the present invention.

Referring to FIG. 7, because the switch elements SW1 to SW4 are conducted by turns (i.e. when the switch elements SW1 and SW4 are turned on, switch elements SW2 and SW3 are turned off; when switch elements SW2 and SW3 are turned on, SW1 and SW4 are turned off), the current sensing circuit 34 enables the first comparator 341 to process two inputted current signals Va and Vb, which are inputted at the end a and the end b of the first comparator 341 (i.e. when Va>Vb, the first comparator 441 outputs a Vcc voltage; when Va<Vb, it outputs a zero voltage), and then output them as the current phase signal Sc to the second input end of the phase comparator 351 of the phase lock loop 35. As shown in FIG. 5B, in other embodiments, the current phase signal Sc can be further inputted to a first input end of the second comparator 342. The more stable current phase signal Sc' can be obtained for outputting to the phase comparator 351 through comparing the current phase signal Sc inputted at the first input end of the a second comparator 342 with the a half of Vcc power supply (by dividing the power supply Vcc with the forth and fifth resistors R4 and R5), which is inputted at the second input end of the second comparator 342, and then outputted to the phase comparator 351.

The phase comparator 351 receives the phase switching signal Sp and the current phase signal Sc or Sc', and then compares these two signals Sp and Sc (or Sc') to obtain a phase difference and then output a positive or negative pulse signal to the loop filter 352. For example, the positive pulse signal is outputted when the phase switching signal is greater than the current phase signal, and the negative pulse signal is outputted when the phase switching signal is smaller than the current phase signal. Additionally, the loop filter 352 can normalize and convert the pulse signal into a direct current voltage Vr by an inside integrator, and then outputs the direct current voltage Vr to the controller 31 in accordance with the direct voltage Yr. The voltage controlled oscillator 353 outputs an adjusted phase-switch controlling signal So to the controller 31. Particularly, the phase switching signal Sp, the current phase signal Sc and the phase-switch controlling signal So are frequency signals.

The controller 31 further generates and outputs driving signals Sd (S1 to S4) to four switch elements SW1 to SW2 of the driving circuit 32, respectively, in accordance with the phase-switch controlling signal So. Thus, the controller 31 can control four switch elements SW1 to SW4 to be switched on or off by turns for further controlling the phase switching state of the magnetic pole of the motor 4.

Figure 1:
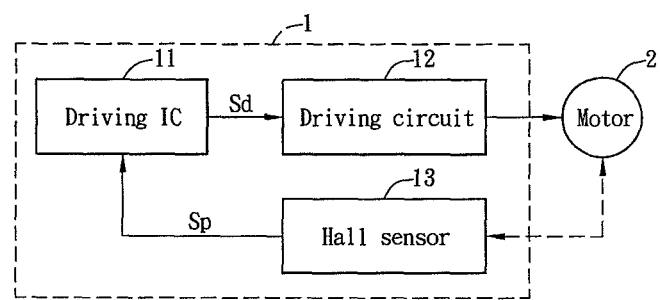
FIG. 1 is a circuit block diagram of a conventional motor control apparatus.
Figure 2A:
FIGS. 2A to 2C are schematic diagrams of waveforms for all sorts of the signals detected by the motor control apparatus of FIG. 1 during the motor is at the condition of rating voltage and rotating speed, the increased voltage and the decreased voltage.
Figure 2B:
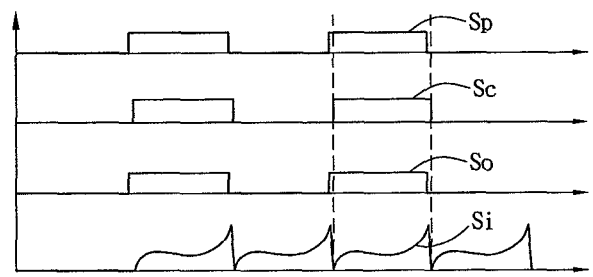
Figure 8A:
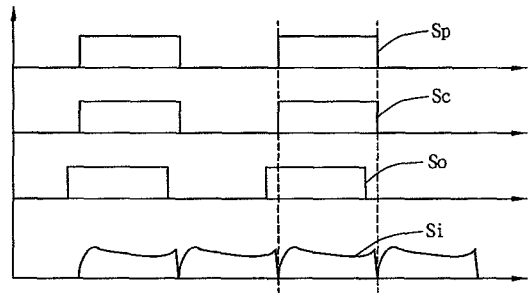
FIGS. 8A to 8C are schematic diagrams showing the waveforms for all sorts of the signals of the present invention after adjustment of the phase lock loop during the motor is operated at the rating voltage and rotating speed, the increased voltage and the decreased voltage.
Figure 8B:
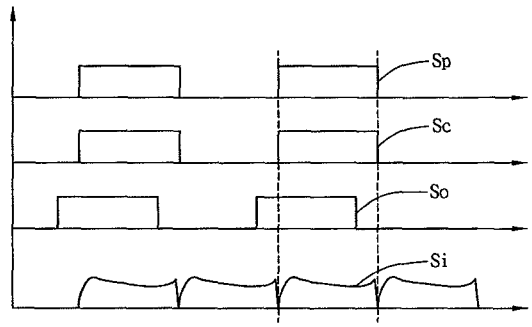
Figure 8C:
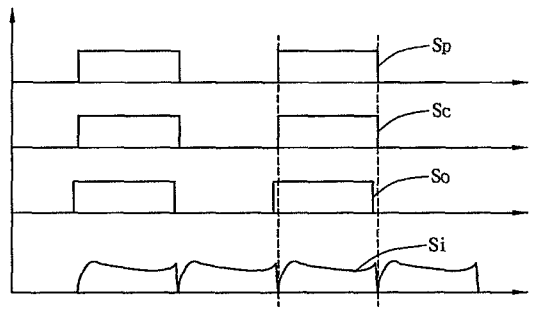

As shown in FIGS. 8A, 8B and 8C, FIG. 8A is a schematic diagram presenting the waveforms of each of the signals including the phase sensing signal Sp, the current phase signal Sc, the adjusted phase-switch controlling signal So and the current waveform Si during the motor is operated at the rating voltage and rotating speed. FIGS. 8B and 8C are schematic diagrams presenting the waveforms of each of the signals after phase adjustments during the motor is operated at increased or decreased voltage (or after change of the rotating speed or the loading). FIGS. 2B, 8A and 8B are exemplified to illustrate comparative differences of the phase sensing signal Sp, the current phase signal Sc, the adjusted phase-switch controlling signal So and the current waveform Si before and after phase adjustment. As shown in FIG. 8A, the phases of the phase sensing signal Sp and the current phase signal Sc are identical, and the even current waveform Si presents high efficiency of the motor. Referring to FIG. 2B (without phase adjustment), when the voltage of the motor is increased, it causes the phase of the current phase signal Sc lags that of the phase sensing signal Sp and the uneven current waveform Si (with a protruding rear portion) is formed as well, which indicates low motor efficiency. In addition, as shown in FIG. 8B, the phase lock loop described herein can provide leading adjustment for the phase-switch controlling signal So (corresponding to the phase-switch controlling signal So as shown in FIG. 8A) and generate the adjusted phase-switch controlling signal So to drive the motor in accordance with the phase difference of the current phase signal Sc and the phase sensing signal Sp. Furthermore, it also can synchronize the phases of the detected phase sensing signal Sp and current phase signal Sc with continuous adjustments so that an evener current waveform Si can be obtained and the motor can be operated with even better (or superior) efficiency.

Figure 2C:
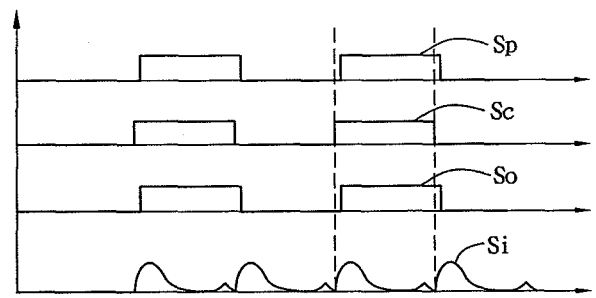

Similarly, as shown in FIG. 2C (without phase adjustment), the phase of the current phase signal Sc leads to that of the phase sensing signal Sp when the voltage of the motor is decreased. Additionally, the uneven current waveform Si (with a protruding front portion) represents low motor efficiency as well. The phase lock loop can provide lagging adjustment for the phase-switch controlling signal So (corresponding to the phase-switch controlling signal So as shown in FIG. 8A) and generate the adjusted phase-switch controlling signal So to drive the motor in accordance with the phase difference of the current phase signal Sc and the phase sensing signal Sp. Furthermore, it also can synchronize the phases of the detected phase sensing signal Sp and current phase signal Sc with continuous adjustments so that an evener current waveform Si can be obtained and the motor can be operated with even better (superior) efficiency In summary, the present invention utilizes the phase lock loop to track the phase difference between the phase switching signal Sp and the current phase signal Sc of the motor, and then generates the adjusted phase-switch controlling signal So to drive the motor. Therefore, even if the motor is operated at different rotating speeds or the power terminals or the loadings have variations, the motor control apparatus still can provide immediate and proper phase adjustments for the phase-switch controlling signal So, sustainably and promptly, in accordance with the error value generated from the feedbacked sensing signals Sp and Sc. That is, it can reduce the phase difference of the phase switching signal Sp and the current phase signal Sc until that of the two signals Sp and Sc have no difference. Then, the phase lock loop locks the phase-switch controlling signal So and stops adjusting. At the moment, because the phases of the phase switching signal Sp and the current phase signal Sc are synchronized, the motor can perform better operation efficiency and an even current waveform.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A motor control apparatus electrically connected to a motor, the motor control apparatus comprising:
   a phase sensing circuit detecting a phase switching state of a magnetic pole of the motor when the motor is operating;
   a current sensing circuit detecting a current flowing through a coil of the motor to generate a current phase signal;
   a phase lock loop electrically connected to the phase sensing circuit and the current sensing circuit to receive the phase switching signal and the current phase signal respectively, wherein the phase lock loop compares a phase difference between the phase switching signal and the current phase signal so as to output a phase-switch controlling signal;
   a controller electrically connected to the phase lock loop for receiving the phase-switch controlling signal and then generating a driving signal in accordance with the phase-switch controlling signal; and
   a driving circuit electrically connected to the controller and the motor, wherein the driving circuit receives the driving signal and then controls the phase switching state of the magnetic pole of the motor to drive the motor to rotate in accordance with the driving signal.

2. The motor control apparatus of claim 1, wherein the phase sensing circuit is a Hall sensor.

3. The motor control apparatus of claim 1, wherein the phase lock loop comprises:
   a phase comparator electrically connected to the phase sensing circuit and the current sensing circuit, respectively, to receive the phase switching signal and the current phase signal, respectively, wherein the phase comparator compares the phase difference between the phase switching signal and the current phase signal to output a positive pulse signal or a negative pulse signal;
   a loop filter electrically connected to the phase comparator to receive the positive or negative pulse signal and then normalizing and converting the positive or negative pulse signal into a direct current voltage for output; and
   a voltage controlled oscillator electrically connected to the loop filter for receiving the direct current voltage and then outputting the phase-switch controlling signal to the controller in accordance with the direct current voltage.

4. The motor control apparatus of claim 3, wherein the phase comparator compares the phase switching signal with the current phase signal, the positive pulse signal is outputted when the phase switching signal is greater than the current phase signal, and the negative pulse signal is outputted when the phase switching signal is smaller than the current phase signal.

5. The motor control apparatus of claim 3, wherein the loop filter comprises an integrator, and the positive or negative pulse signal is normalized and converted into the direct current voltage by the integrator.

6. The motor control apparatus of claim 1, wherein each of the phase switching signal, the current phase signal and the phase-switch controlling signal is a frequency signal.

7. The motor control apparatus of claim 1, wherein the controller is a motor drive integrated circuit, IC.

8. The motor control apparatus of claim 1, wherein the driving circuit is a full-bridge circuit and comprises a first switch element, a second switch element, a third switch element and a forth switch element, and the switch elements are electrically connected between the coil of the motor and the controller.

9. The motor control apparatus of claim 8, wherein each of the switch elements is a metal-oxide-semiconductor field-effect transistor, MOSFET.

10. The motor control apparatus of claim 8, wherein the first switch element, the second switch element, a drain of the third switch element and a drain of the forth switch element are electrically connected to both ends of the coil of the motor respectively, a source of the first switch element and a source of the second switch element are electrically connected to a power supply respectively, a source of the third switch element and a source of the forth switch element are electrically connected to a ground terminal, and a gate of the first switch element, a gate of the second switch element, a gate of the third switch element and a gate of the forth switch element are electrically connected to the controller respectively.

11. The motor control apparatus of claim 10, wherein the controller outputs the driving signals to the switch elements, respectively, and switches on or off the switch elements by turns to control the phase switching state of the magnetic pole for driving the motor in accordance with the driving signal.

12. The motor control apparatus of claim 10, wherein the current sensing circuit comprises a first resistor and a first comparator, a first end of the first resistor is electrically connected to the coil of the motor, a second end of the first resistor is electrically connected to the drains of the first and third switch elements of the driving circuit, a first input end and a second input end of the first comparator are electrically connected to a second resistor and a third resistor, respectively, and then electrically connected to the first and second ends of the first resistor, respectively, and an output end of the first comparator is electrically connected to the phase lock loop.

13. The motor control apparatus of claim 10, wherein the current sensing circuit comprises a first resistor, a first comparator and a second comparator, a first end of the first resistor is electrically connected to the coil of the motor, a second end of the first resistor is electrically connected to the drains of the first and third switch elements of the driving circuit, a first input end and a second input end of the first comparator are electrically connected to a second resistor and a third resistor, respectively, and then electrically connected to the first and second ends of the first resistor, respectively, an output end of the first comparator is electrically connected to a first input end of the second comparator, a second input end of the second comparator is electrically connected to a first end of a forth resistor and a first end of a fifth resistor, a second end of the forth resistor is grounded, a second end of the fifth resistor is electrically connected to the power supply and then grounded, and an out put end of the second comparator is electrically connected to the phase lock loop.

14. The motor control apparatus of claim 10, wherein the current sensing circuit comprises a sixth resistor, a seventh resistor and a first comparator, a first end of the sixth resistor and a first end of the seventh resistor are electrically connected to the sources of the third and forth switch elements, a second end of the sixth resistor and a second end of the seventh resistor are grounded, a first input end and a second input end of the first comparator are electrically connected to a second resistor and a third resistor, respectively, and then electrically connected to the first ends of the sixth and seventh resistors, respectively, and an output end of the first comparator is electrically connected to the phase lock loop.

15. The motor control apparatus of claim 10, wherein the current sensing circuit comprises a sixth resistor, a seventh resistor, a first comparator and a second comparator, a first end of the sixth resistor and a first end of the seventh resistor are electrically connected to the sources of the third and forth switch elements respectively, a second end of the sixth resistor and a second end of the seventh resistor are grounded, a first input end and a second input end of the first comparator are electrically connected to a second resistor and a third resistor, respectively, and then electrically connected to the first ends of the sixth and seventh resistors, respectively, an output end of the first comparator is electrically connected to a first input end of the second comparator, a second input end of the second comparator is electrically connected to a first end of a forth resistor and a first end of a fifth resistor, a second end of the forth resistor is grounded, a second end of the fifth resistor is electrically connected to the power supply and then grounded, and an output end of the second comparator is electrically connected to the phase lock loop.

16. The motor control apparatus of claim 1, wherein the motor is a direct-current brushless motor.

\* \* \* \* \*